US006206156B1

United States Patent
Nünlist

(10) Patent No.: US 6,206,156 B1
(45) Date of Patent: Mar. 27, 2001

(54) SECTION INSULATOR FOR CONDUCTOR RAILS

(75) Inventor: Felix Nünlist, Herrenschwanden (CH)

(73) Assignee: Furrer & Frey AG, Bern (CH)

( * ) Notice: Subject to any disclaimer, the term of this patent is extended or adjusted under 35 U.S.C. 154(b) by 0 days.

(21) Appl. No.: 09/147,872

(22) PCT Filed: Jul. 18, 1997

(86) PCT No.: PCT/EP97/03862

§ 371 Date: May 24, 1999

§ 102(e) Date: May 24, 1999

(87) PCT Pub. No.: WO99/03700

PCT Pub. Date: Jan. 28, 1999

(51) Int. Cl.$^7$ ..................................................... B60M 1/14
(52) U.S. Cl. ...................... 191/22 R; 191/23 A; 191/39; 191/40; 191/33 R
(58) Field of Search .................................. 191/33 R, 36, 191/39, 40, 22 R, 23 A

(56) References Cited

U.S. PATENT DOCUMENTS 3,985,211 * 10/1976 Bommart ................................. 191/25
5,865,282 * 2/1999 Gluck ............................... 191/22 DM

FOREIGN PATENT DOCUMENTS

195821 * 2/1938 (CH) ..................... 191/23 A
2117337 * 10/1983 (DE) .............................. B60M/1/30

\* cited by examiner

Primary Examiner—S. Joseph Morano
Assistant Examiner—Frantz Jules
(74) Attorney, Agent, or Firm—Senniger, Powers, Leavitt & Roedel

(57) ABSTRACT

The contact rail assembly (1) for electrically driven vehicles has two essentially rigid contact rails (2, 2', 44) which are arranged in a line in the travel direction and are separated by a distance (L1). Two transition horns (6, 6', 45a, 45b) extend into the intermediate transition region, wherein one transition horn (6, 6', 45a, 45b) is attached to each of the contact rails (2, 2', 44). On one section (L2) of the transition region there are the transition horns (6, 6', 45a, 45b) that run parallel to each other separated by a distance (L3) and at an angle to the contact rail (2, 2', 44) and essentially parallel to the plane of travel of the vehicle, whereby the width of the transition horns (6, 6', 45a, 45b) is less than the width of the contact rails (2, 2', 44). With this configuration, a relatively short transition region can be created between the contact rails (2, 2', 44), and the separation (L3) of the short contact wires (21) running parallel in the transition region, which are attached to the underside of the transition horns (6, 6', 45a, 45b), is likewise relatively small. This contact rail assembly (1) makes possible a transition by one current collector of the vehicle from one contact rail (2, 2', 44) to the other, and a defined current supply is assured (FIG. 1).

12 Claims, 9 Drawing Sheets

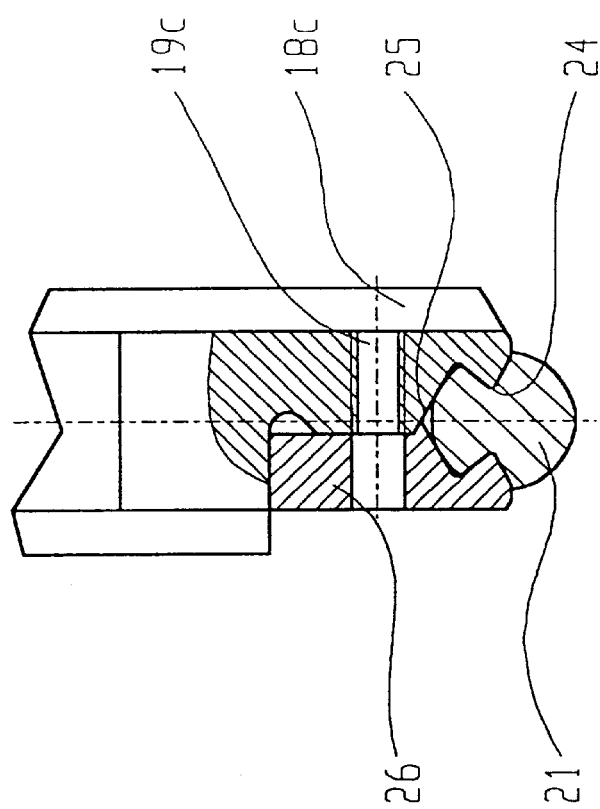
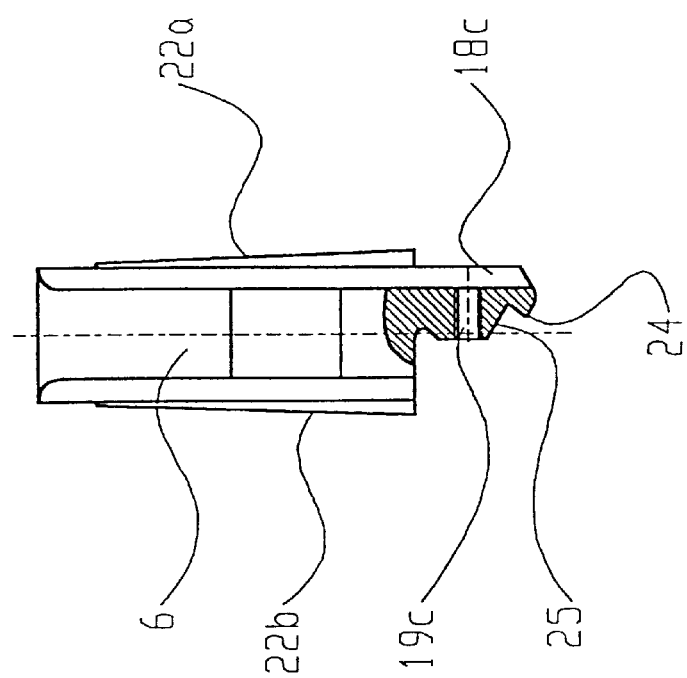
Fig. 4b
Fig. 4a

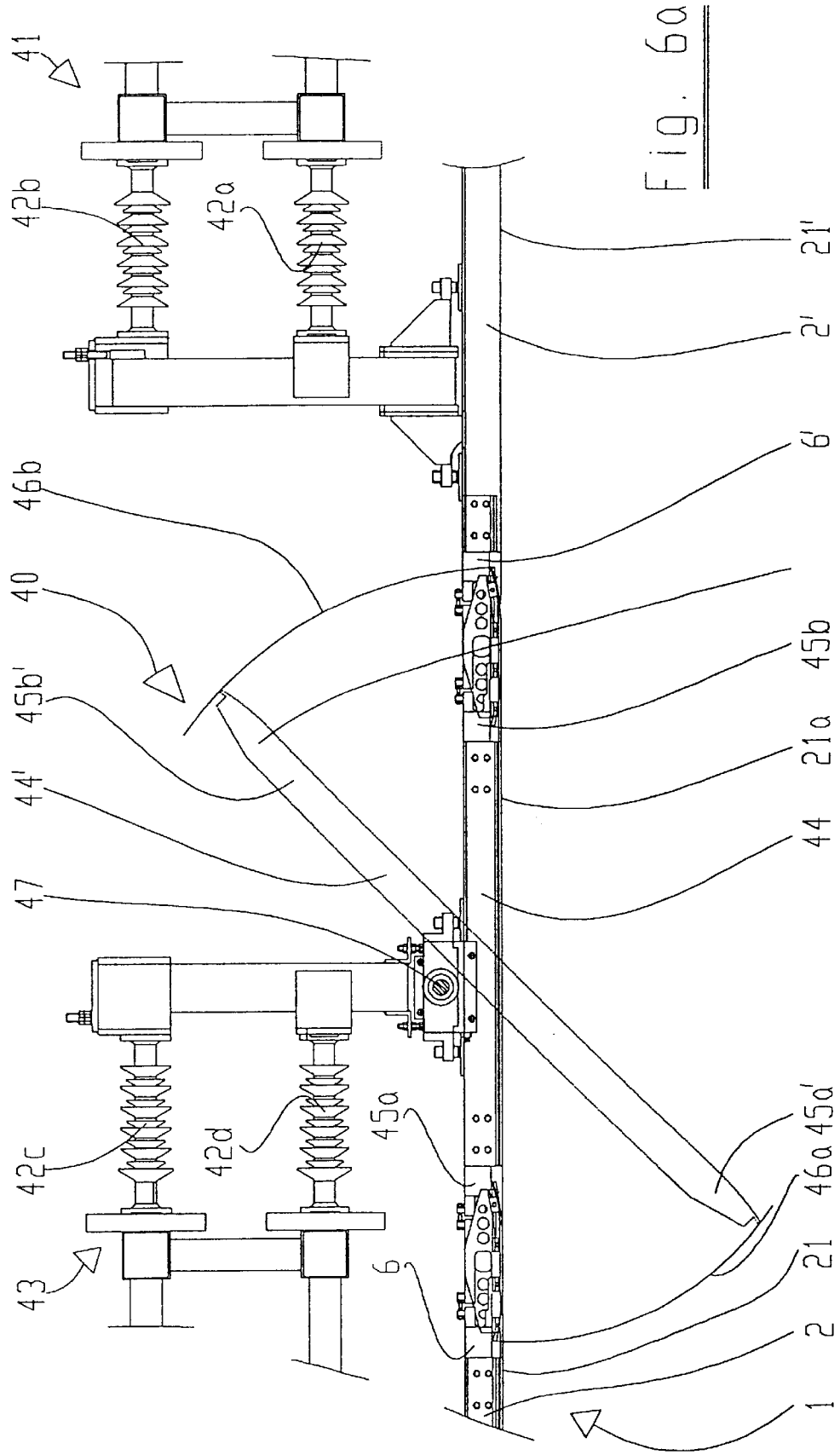

SECTION INSULATOR FOR CONDUCTOR RAILS

BACKGROUND OF THE INVENTION

The invention pertains to a contact rail assembly for electrically driven vehicles. Electrically driven vehicles receive power via current collectors from contact lines under electrical voltage. Contact wires used for contact lines are defined in European Standards. To supply electrical power to current collectors, the contact lines are arranged either as hanging wire structures over the tracks or are attached to contact rails. Contact rails are usually employed when power is provided under spatially constricted conditions. Compared to contact rails, suspended wire structures require more space since the contact wire is suspended by means of suspension wires that hang at short intervals from a support cable, and the support points on the support cable are located about 30 to 180 cm higher than the contact wire. The required "construction space" is described by the concept of "system height," and the system height is equal to the vertical distance to the tracks at the support points. For financial reasons, in tunnels and overpasses, for example, in maintenance or assembly sheds, the system height must necessarily be designed to be very short. Furthermore, the contact wires and support cables are tensioned mechanically to 8–30 kN in order to allow travel speeds of the current collectors of up to 500 km/h. The tensioning devices thus required are complex structures that are difficult to set up, particularly in tunnels, since they require additional space. Another problem is that the current collector mounted on the vehicle is pressing upward with a force of 70–300 N, so that additional space is needed. For these reasons, rigid contact rails are used for travel sections with limited space relationships, such as tunnels or stretches under overpasses, since when using contact rails, no support cables are needed and the contact wire is not deflected upward, since it is attached to the contact rail. Thus, when using the contact rail, the required system height is less than for suspended support structures. Since contact rails can only be produced in limited lengths (usually, 12 m) and since they expand as a result of fluctuations in ambient temperature and as a result of heating due to current flow, they are cut into sections in tunnels, for instance, and are mechanically and electrically separated from each other. Contact rails are also cut into sections in the electrification of maintenance sheds, swing bridges and drawbridges.

The transition between two sections of contact rail causes problems. It is usual to run parallel sections of contact rail in a relatively long transition region of a length of 150 cm and more. A partial parallel run of sequential contact rails is cost intensive since, in general, more contact rails and additional support structures are needed. In addition, the transition of the current collector from one contact rail to another is not technically easy to handle. Due to the construction width of the contact rails, the parallel run of the contact wires attached to the contact rails occurs in a relatively long distance of 10 cm and more from each other, and over a length of 150 cm and more the sliding strip attached to the current collector slides along one or both contact wires alternately in an uncontrolled manner.

The result of one-side sliding of the contact wire means that the contact wires positioned at the contact rails do not exactly run at the same height, which can be attributed, for example, to inaccuracies in the manufacture or the "on-site assembly" of the contact rails. If the contact is along only one sliding contact wire, then an electrical field forms in the small air gap between the sliding contact wire that does not contact but is still under voltage, and the current collector, and the electric field increases as the size of the air gap decreases. As a result of the high field intensity in this region, arcing may occur. Arcing of any kind is undesirable, since it causes a successive burn-up or wear on the contact wire and on the current collector and produces induction-related voltage peaks that can damage the electric motor of the vehicle. If both sliding contact wires make contact, then arcing occurs due to the given inaccuracies with different contact forces, so that different, significantly fluctuating transition resistances occur at the two contact sites between contact wire and current collector, which is undesirable.

In addition to contact wires not exactly located at the same height, and the described electrotechnical problems, the contact point between contact wire and current collector can "skip" from one contact wire to the other under certain circumstances, and this produces an impulse on the current collector every time. This impulse is greater, the greater the speed of travel. Due to the relatively large spacing of the parallel-running contact wires in conventional contact rail assemblies, the impulses are applied relatively far outside the center of the sliding contact of the current collector, so that the occurring impulses cause undesirable, large torque impacts on the current collector and it is deflected accordingly. Another problem in known contact rail assemblies is that the ends of the contact rail must be curved upward in order to ensure that the end of the contact rail will not thread into the linkage of the current collector and destroy it. Bending up the relatively rigid contact rail is only possible if the bend is applied to a relatively long section, so that the mentioned long transition region will result. In addition, bending of the relatively rigid contact rail profile is only possible in a workshop, and as a rule, the 12 m long contact rail bars are connected with great effort.

SUMMARY OF THE INVENTION

The purpose of the present invention is to create a contact rail assembly that eliminates the above-mentioned disadvantages, and in particular, allows a good transition with little effort between two contact rail sections, which can be traversed at high speeds, with a long service life and requires little maintenance expense.

The underlying principle of the invention is that two sequential contact rails in the travel direction are arranged in a line and at a relatively short distance from each other, and at the opposing ends of the contact rails there is one transition horn, whose free ends extend into the transition region and do not contact each other.

Since the transition horns do not touch each other, in a first design example of the invention, the two contact rails or the associated transition horns are electrically and mechanically disconnected from each other. But for many applications it is desirable for there to be an electrical connection between two opposing transition horns. Thus, according to a second design example, the transition horns are electrically connected to each other by at least one separate contact section.

In both variants, the transition horns are configured and designed so that in a top view, they run into the contact rail assembly on one section of the transition region at a slant with respect to the contact rails, i.e., their free ends protrude out to the side, and run essentially parallel at a distance from each other. The two transition horns are essentially straight on this section. Since an electric field forms between the two transition horns, in the first-described variant of the invention, the spacing of the parallel-running transition horns must be large enough so that even at high humidity, no sparking or arcing can take place between the transition horns. For example, the middle spacing of the two transition horns is 55 mm, which represents a sufficient isolation spacing at an operating voltage of 1.5 kV. For the same reason, in the first variant, the free ends of the transition horns have a corresponding distance from the opposing contact rail.

Seen in a side view, the transition horns are positioned against the contact rails such that a contact wire attached to the underside of a transition horn passes smoothly and as a single piece onto the corresponding contact rail, and the contact wire attached at the underside of the other contact rail runs preferably at the same height above the travel plane.

Thus, the transition region is not formed by the contact rail itself, but rather by separate components, i.e., by the transition horns. The advantage of this is that the contact rails need not be curved upward. The transition horns can be very precisely manufactured, assembled and adjusted. In comparison to the contact rails, they are short and thus very easy to handle.

One important advantage of the use of transition horns consists in that the transition region between the contact rails can be made very short. Thus the section of the transition region where the two transition horns and the contact wires (attached to the underside of the two transition horns) run parallel is likewise very short. Only on this short section does the current collector make a sliding contact with two contact wires. Since the transition horns can be mounted very precisely, i.e. primarily at the same height, the result is that the current collector passes in a defined manner, from the first transition horn in the travel direction, briefly onto both transition horns and makes a sliding contact with it with roughly the same contact force. Next, the current collector "leaves" the first transition horn and makes a sliding contact with a short path only with the second transition horn in the travel direction, or with the following contact rail. Due to the sliding contact with both transition horns of preferably the same size contact force, the transition resistance at the contact points is also roughly equal, so that a voltage drop between the contact points is avoided. Furthermore, spark formation and the resultant wear on the current collector and the contact wires is reduced to a minimum by the very short transition region and by precise assembly of the transition horns. A defined contacting of one, then both, and then again of only one of the transition horns, prevents the contact point between current collector and transition horn from skipping back and forth from one transition horn to the other, creating sparks and causing the current collector to vibrate. A low-vibration propagation of the current collector prevents the current collector from lifting off the contact wire, so that a continuous power supply is assured, and mechanical wear caused by dynamic friction forces on the current collector and contact wire are minimized. Another advantage of this contact rail assembly is that the two transition horns of a transition region can be configured identically, so that the development and manufacturing costs can be reduced. Using an identical configuration and arrangement of the transition horns, the contact rail assembly is point-symmetrical with regard to an intersection point, viewed from above, that is obtained from the intersection of the center perpendicular of the center lines of the two contact rails located in the transition region, with the aligned center lines of the contact rails.

According to a refinement of the invention, from a top view of the travel plane, the width of the transition horns is smaller than the width of the contact rails. Thus a relatively small distance can be obtained between the contact wires attached to the undersides of the transition horns. Assuming that the contact wires run centrally on the underside of the transition horns viewed from above, the spacing of the two contact wires in the described symmetrical contact rail assembly can be computed from the sum of the spacing of the two transition horns (on the section of the transition region where they run parallel to each other) and the width of one transition horn. The spacing of the two transition horns is selected as small as possible, depending on the operating voltage, in order to prevent arcing and also to achieve a vibration-free or jolt-free transition of the current collector from one transition horn to the other. Thus, at a given operating voltage, the spacing of the contact wires running centrally on the underside of the two transition horns will be smaller, the smaller the width of the transition horns. Consequently, given a small width of the transition horns, the spacing (lever arm) between the contact point of the contact wire with the current collector, and the middle of the current collector is relatively small, so that the contact forces (static and dynamic contact forces) occurring at the contact point create very little torque and the current collector is deflected very little. Lifting of the current collector and any resultant spark formation is thus prevented and a continuous power supply is assured.

According to a refinement of the invention, the transition horns in the connection regions to the contact rails are curved, as seen in a top view, so that given a central placement of the ends of the transition horns with respect to the contact rails, the middle lines of the transition horns open tangentially into the longitudinal axes of the corresponding contact rails. This type of soft or continuous transition of the contact wire attached to the underside of the contact rail or to the transition horns prevents bending of the contact wire. In addition, in the transition of the current collector from the contact rail to the transition horn, a lateral, relative acceleration of the slide bar of the current collector with respect to the transition horn will occur gradually and not suddenly. Thus, lateral friction forces resulting from this relative acceleration and which lead to a lateral deflection of the current collector are prevented by a soft transition.

According to a refinement of the invention, the underside of the transition horn is not curved in the region between the free end and the end that is attached to the contact rail, i.e. in a middle region of the transition horn, and is curved upward at the free end of the transition horn. This kind of curvature of the underside at the free end of the transition horn allows a soft transition of the sliding contact of the current collector from the free end of the transition horn onto its middle region, or onto the adjoining contact rail. Peaks in the vertical acceleration of the current collector and peaks in the contact force between the contact rail of the current collector and the contact wire will be avoided. Furthermore, due to the upward curved free ends of the transition horn, the sliding contact of the contact rail will be prevented from impacting on the end of the transition horn, or the transition horn will be prevented from threading into the linkage of the current collector and destroying it.

According to a refinement of the invention, the curvature of the underside of the transition horn, and in particular, the height position of the contact wire attached to it, are adjustable. This potential for adjustment allows a precise adjustment of the curvature of the underside of the transition horn and thus an optimum height setting of the contact wire attached to the underside of the transition horn. The adjustment takes place upon assembly of the transition horn and thus can be adjusted "on site" individually for each transition region.

According to a refinement of the invention, the curvature of the underside of the transition horn is adjustable by an adjusting mechanism, which is connected to the transition horn and has at least one clamping element. A clamping element of this kind can preferably transfer tension, but also compressive forces, so that the curvature of the underside of the transition horn at the free end can be both increased and also decreased; the free end of the transition horn can thus be curved upward or downward, as needed, and the height position of the contact wire defined by the default curvature can be adjusted precisely.

According to a refinement of the invention, the transition horn as seen in a side view has a slit that passes over the mentioned clamping element. This kind of slit reduces the flexural strength of the transition horn at axes that run parallel to the travel plane and transverse to the travel direction of the vehicle. The curvature of the underside of the transition horn can thus be varied by relatively small tensioning forces.

According to a refinement of the invention, the slit and the tensioning element passing over the slit are located on the top side of the transition horn. Due to the slitting of the outer contour of the transition horn, for example at its upper side, we obtain an "open profile," so that the tensioning forces necessary for an adjustable curvature on the underside of the transition horn can be further reduced.

According to a refinement of the invention, in the region of the tensioning element of the transition horn and/or in the region of the free end from a side view there is at least one opening, so that at least one opening of the mentioned slit opens into it. Due to these leads in the "profiled interior" of the transition horn, the cross section, and in particular, the flexural resistance of the transition horn are reduced. For example, the transition horn has in its middle region several long, hole-like recesses of differing width that line up and steadily vary the rigidity of the transition horn in its longitudinal direction. One positive side-effect of such openings is the resultant reduction in weight. In order to prevent mechanical stress peaks in the transition horn when adjusting the curvature of the underside of the transition horn, the transitions are of a "soft" design between the individual openings, i.e. rounded, for example. In addition to the openings in the middle region of the transition horn, round holes, for example, are provided in the region of the free end that primarily reduce the weight.

According to a refinement of the invention, at least one of the contact rails defining the intermediate transition region and the transition horn attached to this contact rail can move relative to the other contact rail and its transition horn. Thus, a simple disconnection device for sections of the contact rail can be obtained, like that required, for example, for electrified maintenance sheds, swing bridges, and drawbridges. For example, this type of disconnection device can be provided at the transition of the contact rail of one rotary disk for rail vehicles in order to securely mount contact rails of tracks surrounding the rotary disk. The disconnection device has a short contact rail, for example, with transition horns attached to its ends, and the short contact rail plus transition horns can be moved.

According to a refinement of the invention, the movement of the short contact rail occurs by pivoting about a pivot shaft that is located transverse to the travel direction and parallel to the travel plane of the vehicle. The horizontal pivot shaft can be easily attached via a retaining device, e.g., to the wall or the ceiling of a maintenance shed, a retaining post or such.

According to a refinement of the invention, the contact rail and the transition horn attached to it can be displaced relative to the contact rail following in the travel direction, particularly in the plane parallel to the travel plane. Due to a displacement of one contact rail relative to the other, the transition horn attached to the ends of the contact rails can be displaced toward or away from each other. In order to prevent the displaced contact rail or its transition horn from contacting the other contact rail or its transition horn, a control device can be provided that moves the displaced transition horn at an angle with respect to the other transition horn. In order to enable the displaced contact rail to move, it is attached, e.g., with a retaining device that permits a corresponding movement of the contact rail.

According to a refinement of the invention, at least one attachment element is provided at the transition horn with which the contact wire can be attached, and thus a one-piece transition of the contact wire from the contact rail to the transition horn is possible. This type of attachment element can be a tensioning element, for example, that clamps the contact wire by means of a threaded connection from two sides along a clamp edge. Tensioning elements of this kind allow the replacement of a worn contact wire without having to disassemble or replace the transition horn itself.

According to a refinement of the invention, at the end of the transition horn an attachment compartment is provided in which the attached end of the transition horn can be inserted and attached. The attachment compartment makes possible a positively fitted connection of the end of the transition horn with the contact rail and a simple attachment by means of through-bolts which pass through the contact rail profile or the end section of the transition horn inserted into the contact rail profile. Thus, a mechanical and electrical connection of the transition horn with the contact rail is assured. Specifically, a central attachment of the end of the transition horn makes it possible to attach narrow transition horns, so that the spacing of the contact wires in the transition region can be minimized. Coupling of the horn to the contact rail takes place, for example, with a one-sided connection to the inside of the profile. The one-sided connection has, for example, a wedge-shaped cross section or bevels.

According to another refinement of the invention, the two mutually opposing transition horns or the associated contact rail are electrically connected together. Thus, several individual sections of contact rail can be connected into "one" longer electrically joined contact rail section. The electrical connection is achieved by one or more elastic contact elements.

BRIEF DESCRIPTION OF THE DRAWINGS

The invention will be explained in greater detail below based on the drawings. Shown are:

FIG. 4a, a cross section through the transition horn of FIG. 2 in the region of the tensioning element;

FIG. 4b, an enlarged section of FIG. 4a in the region of the retaining element;

FIG. 6a, a side view of a pivoting contact rail assembly with pivot axis parallel to the travel plane and transverse to the travel direction;

FIG. 6b, a top view of the pivoting contact rail assembly of FIG. 6a;

DETAILED DESCRIPTION OF THE INVENTION

Figure 1:
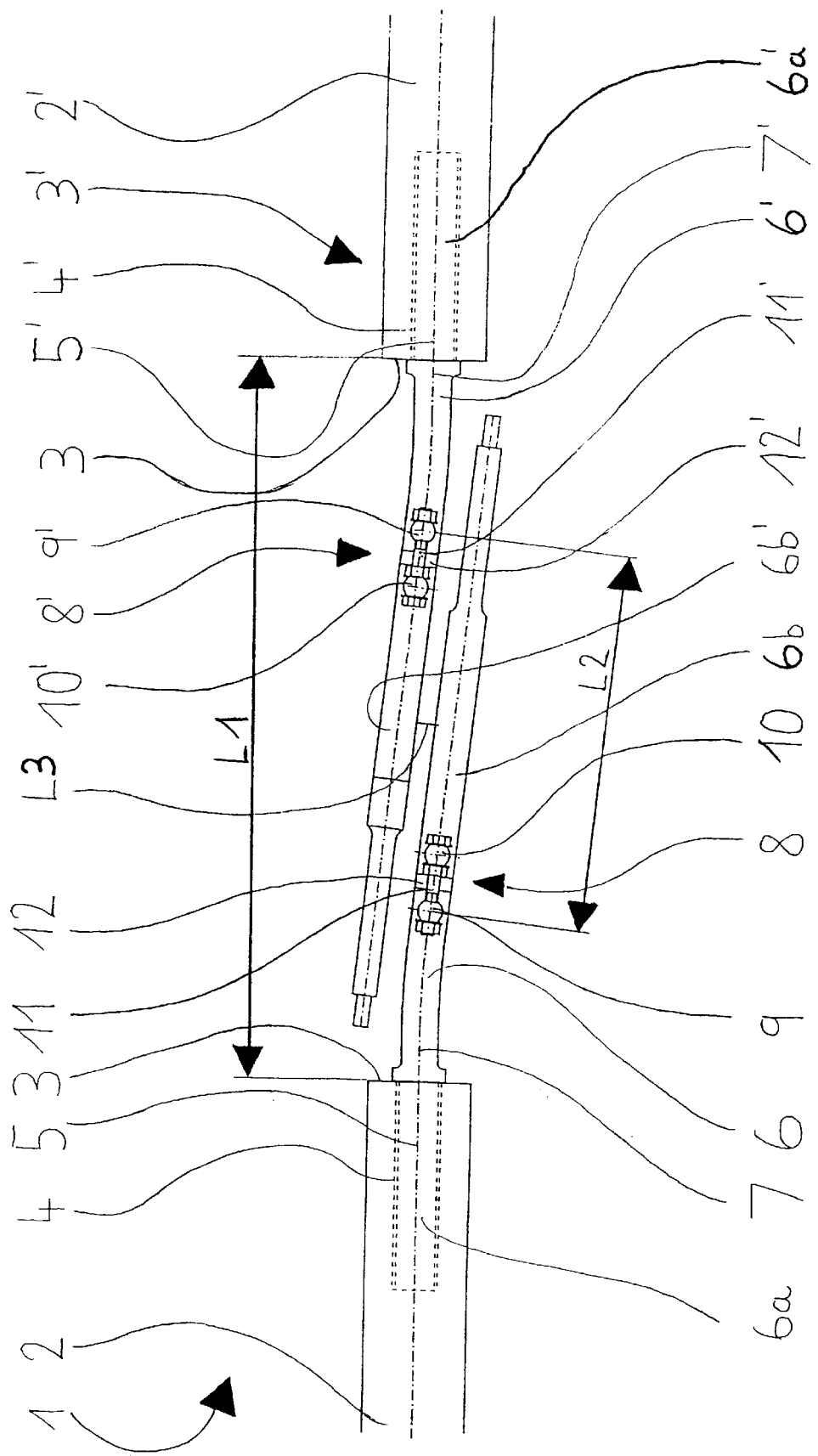
FIG. 1, a top view of a contact rail assembly according to the invention.

FIG. 1 shows a contact rail assembly 1 with two contact rails 2, 2' arranged in a line; the ends 3, 3' of said contact rails are separated by a distance L1. The distance L1 can be 600 mm, for example. At the end of the contact rail 2, 2' there is an attachment compartment 4, 4'. The attachment compartment 4, 4' is centrally aligned with the longitudinal axis 5, 5' of the contact rail 2, 2'. One end 6a of the transition horn 6, 6' is inserted into the attachment compartment 4, 4'. A middle line 7, 7' of the transition horn 6, 6' opens tangentially or coaxially into the longitudinal axis 5 of the contact rail 2, 2', and is curved in the region of the end of the contact rail 2, 2' in the direction of the free end 6b, 6b' of the transition horn, and is not curved in a middle region and the end region 6b, 6b' of the transition horn. At the top side of the transition horn 6, 6' there is an adjusting mechanism 8, 8' for adjusting the curvature of the underside 6d of the transition horn 6, 6' in the region of its free end 6b, 6b' (cf. FIG. 2). The adjusting mechanism 8, 8' has a first bending element 9, 9' and a second bending element 10, 10', which are attached-to the top side of the transition horn and are connected together by a tensioning element 11, 11'. The tensioning element 11, 11' can support both tension and compression forces. The tensioning element 11, 11' spans a slit 12 which is located at the top side of the transition horn 6, 6' between the two bending elements 9, 9' and 10, 10'.

The width of the two transition horns 6, 6' is less than the width of the contact rail 2, 2'. In the middle of the transition region, the two transition horns 6, 6' have a spacing L3, which is large enough to prevent sparks or arcing. The spacing L3 is thus an "insulation gap," so that the two transition horns and the respective contact rails are electrically decoupled from each other. In the middle region of the two transition horns they run along a section L2 parallel to each other and at an angle to the longitudinal axes 5, 5' of the contact rails 2, 2'. At the underside of the transition horns 6, 6' each has a contact wire (not visible in FIG. 1), which runs underneath the corresponding middle line 7 or 7'. The spacing of the contact wires running parallel on the section L2 results from the sum of the spacing L3 and the width of a transition horn 6, 6' and is 55 mm, for example.

Figure 2:
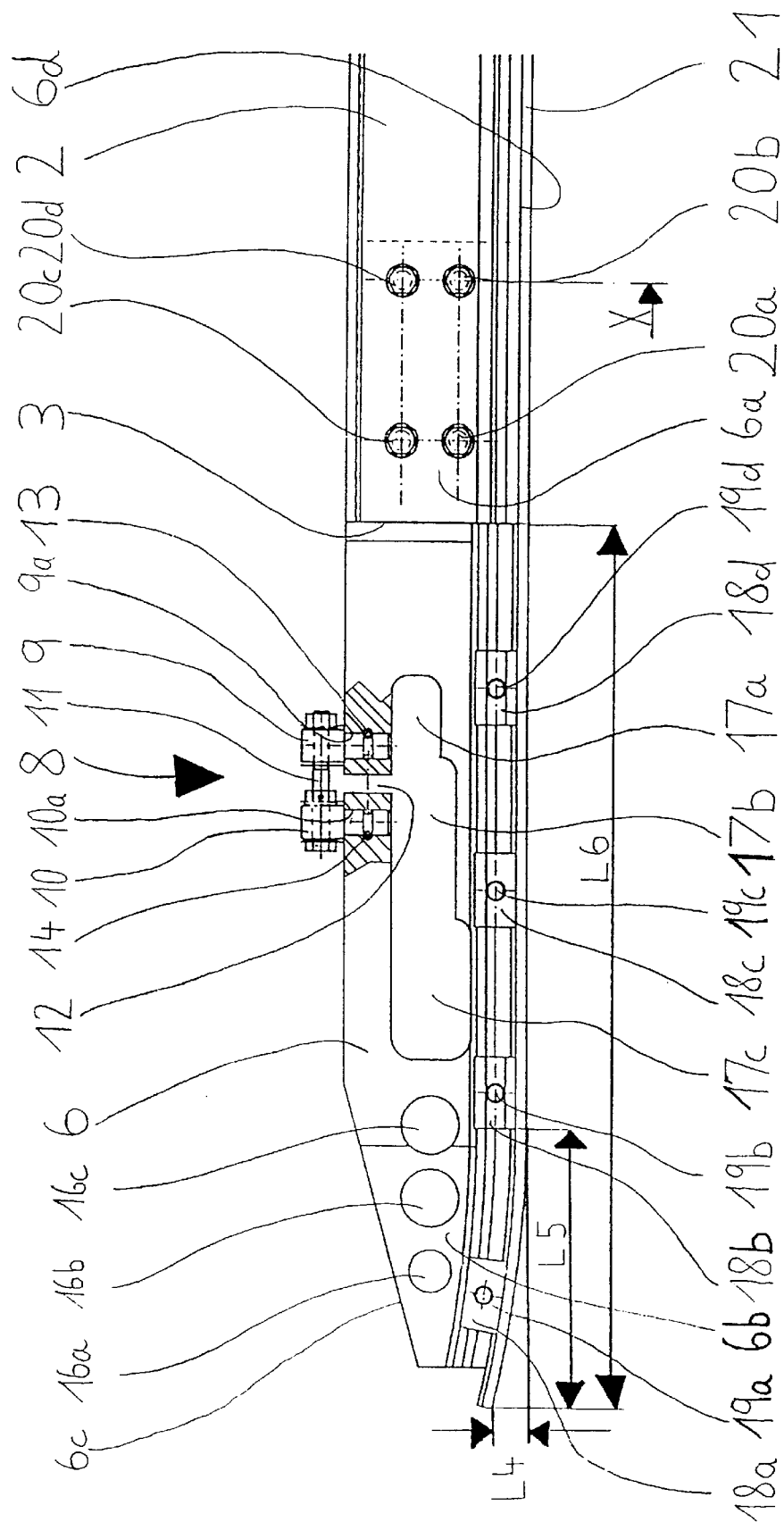
FIG. 2, a side view of a transition horn attached to a contact rail.

FIG. 2 shows the end 3 of the contact rail 2 and the attached transition horn 6 of FIG. 1. The shaded regions at the top side of the transition horn 6 indicate that the bending elements 9 and 10 are inserted into holes of the transition horn 6 and are attached by retaining elements 13 and 14. As retaining elements, split pins, bolts, or similar elements can be used, for example. The free end 6b of the transition horn 6 has on its top side a bevel 6c and features circular recesses 16a, 16b, 16c on the inner region to reduce the bending resistance of the free end and to reduce the cross section or the weight of the transition horn 6. The underside of the free end 6b is curved upward by the distance L4. The distance L4 is 21 mm, for example. The length L5 of the curved section of the underside 6d can be 177 mm, for example. In the middle region of the transition horn, in particular in the region of the tensioning element 11, the transition horn has long, hole-like recesses 17a, 17b, 17c of varying widths. The widths of these long, hole-like recesses 17a, 17b, 17c increase in the direction of the free end of the transition horn 6, which leads to a continuous reduction in the bending strength of the transition horn 6. The slit 12 opens into the long, hole-like recess 17b from the top side of the transition horn 6. Along the underside 6d of the transition horn 6 there are tensioning elements 18a, 18b, 18c, 18d, which have threaded holes 19a, 19b, 19c, 19d (cf. FIG. 4a and FIG. 4b). An additional tensioning element can be screwed with the threaded holes and a contact wire 21, which passes as a single piece from the underside of the contact rail 2 to the underside 6d of the contact rail 6, can be clamped on. The end 6a of the transition horn 6 is inserted into the contact rail 2 and attached to the contact rail 2 by means of attachment screws screwed into threaded holes 20a, 20b, 20c, 20d. The section of the transition horn which extends from the contact rail has a length L6. L6 is 477 mm, for example.

Figure 3:
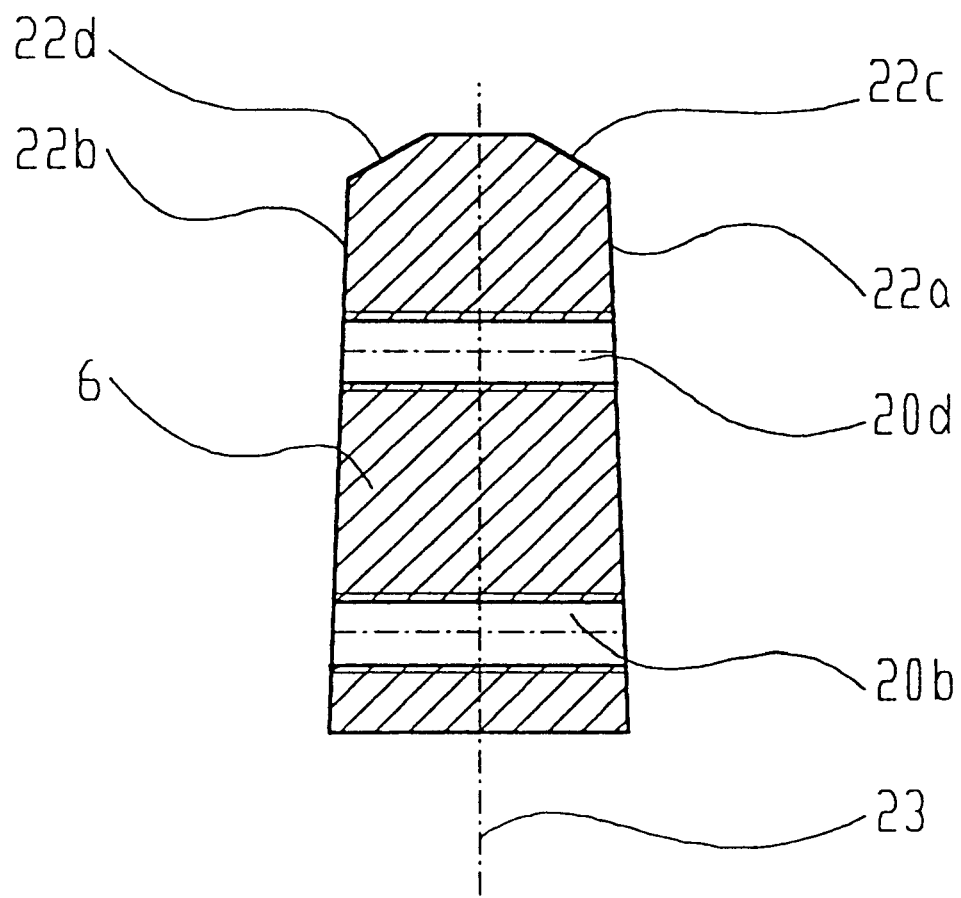
FIG. 3, a cross section through the transition horn of FIG. 2 along line X of FIG. 2.

FIG. 3 shows a cross section through the transition horn of FIG. 2 along line X through the threaded holes 20b and 20d. The cross section through the transition horn 6 in this region is axially symmetric about middle line 23. The side surfaces 22a and 22b of the transition horn run at an angle in the region, with respect to the middle line 23. In the upper region, the transition horn 6 has two slanting surfaces 22c, 22d. The slanting side surfaces 22a and 22b, and also the slanting surfaces 22c, 22d essentially correspond to the profile interior of the contact rail 2 in the region of the attachment compartment and allow a positively fit connection of the transition horn 6 with the contact rail 2.

FIG. 4a shows a cross section through the transition horn 6 in the region of the tensioning element 11. The standing side surfaces 22a, 22b of the transition horn 6 are discernible in the region of the end 6a. The retaining element 18c with the threaded through-hole 19c is used for clamping the contact wire 21, as can be seen more easily in FIG. 4b. The retaining element 18c has a clamping edge 24 and a clamping surface 25 for this purpose.

FIG. 4b shows an enlarged section from FIG. 4a in the region of the tensioning element 18c. The contact wire 21 is clamped by the clamping edge 24 and the clamping surface 25 of the clamping element 18 and by the corresponding clamping edge and a clamping surface of an opposing clamping element 26. The opposing clamping element 26 has a through-hole for the threaded clamping element 18c.

Figure 5:
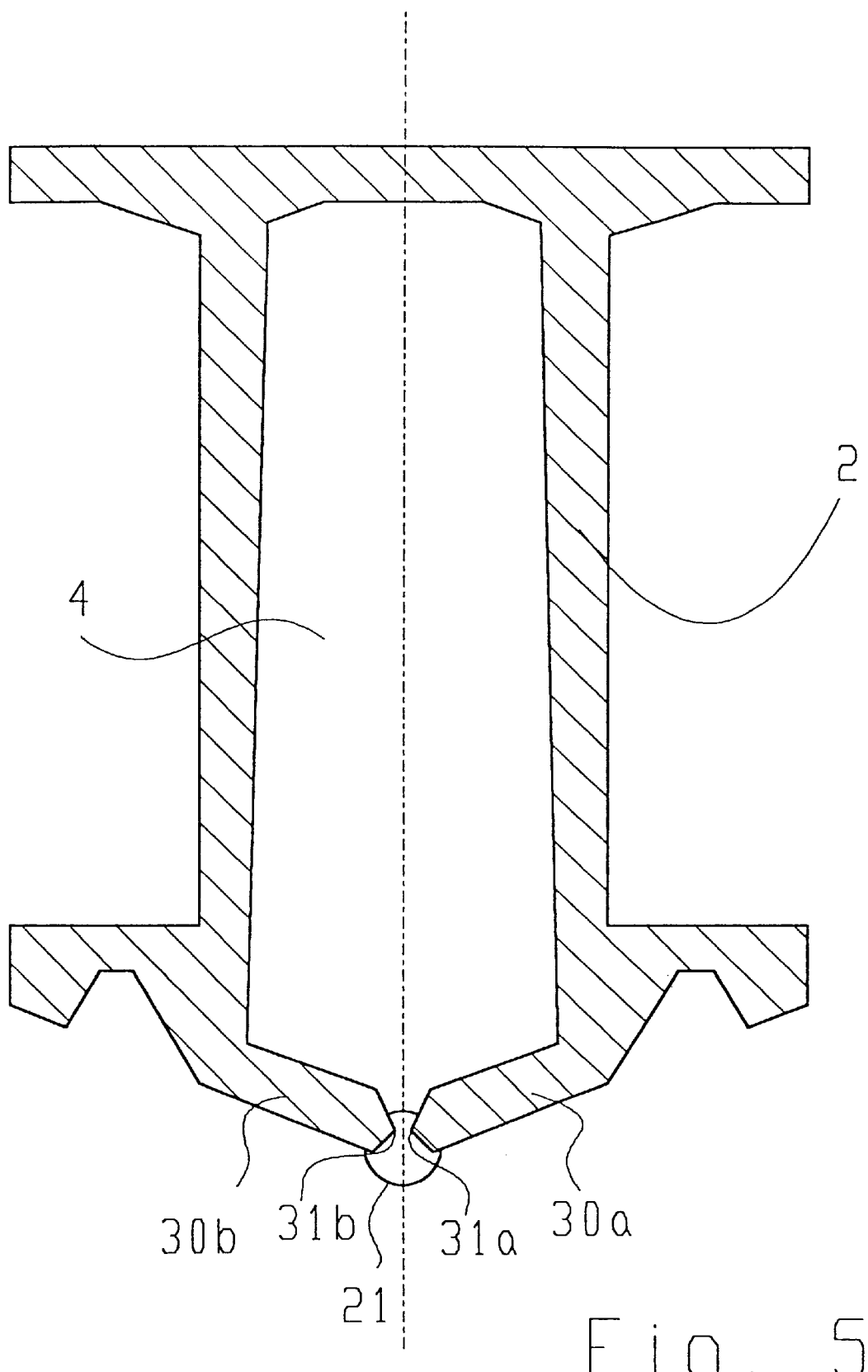
FIG. 5, a cross section through a contact rail profile.

FIG. 5 shows a cross section through a contact rail 2; the end 6a of the transition horn 6 (cf. FIG. 1) can be inserted into the inner space formed by the attachment compartment 4. The contact rail is open at the underside and has two legs 30a or 30b with clamping edges 31a or 31b. The contact wire 21 is clamped by the slight upward bending of these legs 30a, 30b.

FIG. 6a shows a contact rail assembly 1 with contact rails 2, 2', beneath which is attached a contact wire 21 and 21', respectively. Between the two contact rails 2, 2' there is a disconnection device 40. The contact rail 21 is attached by a retaining device 41, which is electrically decoupled from the contact rail 2' by isolators 42a, 42b, to a structure (not illustrated), such as a retaining post, a building, etc. The separator device 40 is attached by a retaining device 43, which is electrically decoupled from the separator device by isolators 42c and 42d, to a structure (not illustrated). The separator device 40 has a short contact rail 44, and at each end one transition horn 45a, 45b is attached. A contact wire 21a is attached beneath the contact rail 44 and its transition horns 45*a* and 45*b*. With the transition horn 6 of the contact rail 2, the transition horn 45*a* forms a first transition region, and with the transition horn 6' of the contact rail 2', the transition horn 45*b* forms a second transition region. By pivoting the contact rail 44 or its attached transition horns 45*a*, 45*b* about a pivot axis 47, which runs parallel to the travel plane of the vehicle (not illustrated) and transverse to its travel direction, the free ends of the transition horns 45*a*, 45*b* move along concentric arcs 46*a*, 46*b* about the pivot axis 47.

Figure 6B:
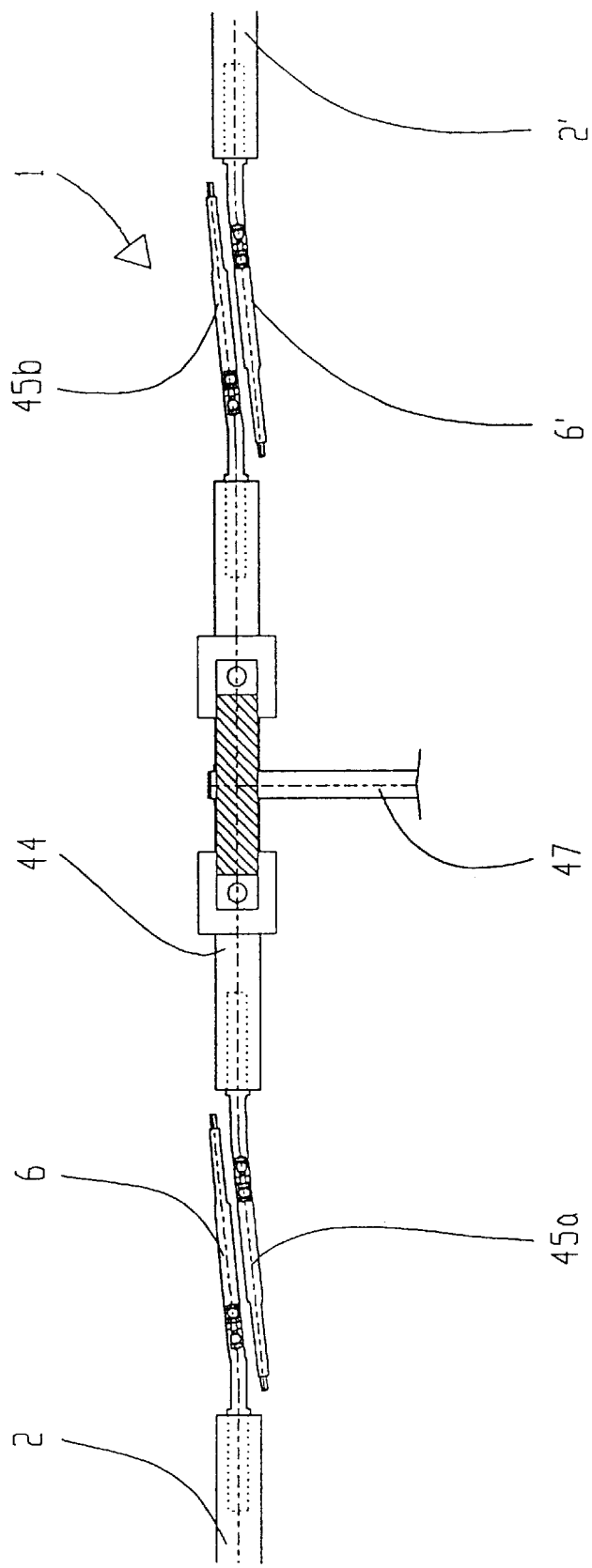

FIG. 6*b* shows the contact rail assembly 1 of FIG. 6*a*, seen from above, and the separator device 40 is cut away in the region between the isolator 42*d* and the contact rail 44. The transition horns 6, 45*a* and 6', 45*b* do not touch, and thus are electrically decoupled from each other.

Figure 7A:
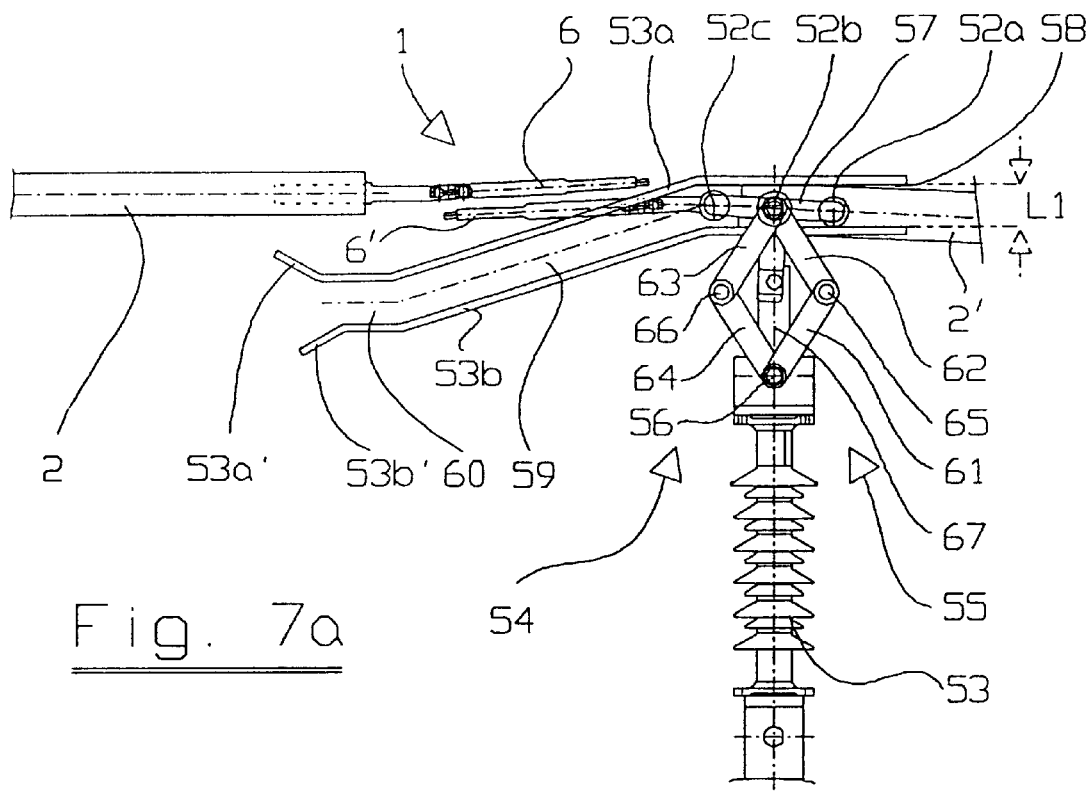
FIG. 7a, a translational contact rail assembly in a first position.

FIG. 7*a* shows a contact rail assembly 1, which can be displaced primarily translationally. The contact rail 2 and its attached transition horn 6 are fixed in place, and the contact rail 2' adjoining in the travel direction can move with its transition horn 6' relative to the contact rail 2. A guide assembly is attached to the contact rail 2', which has three in-line guide assemblies 52*a*, 52*b* and 52*c* arranged in series and connected to each other by a rod-like coupling element 57. In this case, the "outer" two guide assemblies 52*a* and 52*c* with coupling element 57 can turn relative to the contact rail 2' about the guide assembly 52*b* which is located therebetween and which is connected to the contact rail 2'. The guide assembly extends between two guide elements 53*a*, 53*b*, which are fixed in place relative to the contact rail 2 and the transition horn 6. The guide elements 53*a*, 53*b* are arranged at a distance L1 from each other, which is slightly greater than the diameter of the guide assemblies 52*a*, 52*b*, 52*c*, so that the guide assembly device can slide between the guide elements 53*a*, 53*b*. On a first section 58 facing the contact rail 2', the guide elements 53*a*, 53*b* are essentially parallel to the contact rails 2 and 2'. In a region 59 between the contact rails 2 and 2', they are at an angle with respect to the contact rails 2, 2'. On an adjoining, relatively short section 60 facing the contact rail 2, the guide elements 53*a*, 53*b* are again essentially parallel to the contact rail 2, and their free ends 53*a'*, 53*b'* curve away from each other. The contact rail 2' is connected to a retaining device 54 moving parallel to the travel plane and parallel to the contact rail 2, and can be displaced in the direction of the opposing contact rail 2 along the guide elements 53*a*, 53*b*. The retaining device 54 is connected via an isolator 53 to a guide element (not illustrated) that guides the retaining device 54 in the travel direction. After a displacement of the contact rail 2' and of the attached transition horn 6', the guide assemblies 52*a*, 52*b* and 52*c* slide between the guide elements 53*a* and 53*b* arranged at a distance L1 from each other, which leads to a lateral offset of the contact rail 2' relative to the contact rail 2.

Figure 7B:
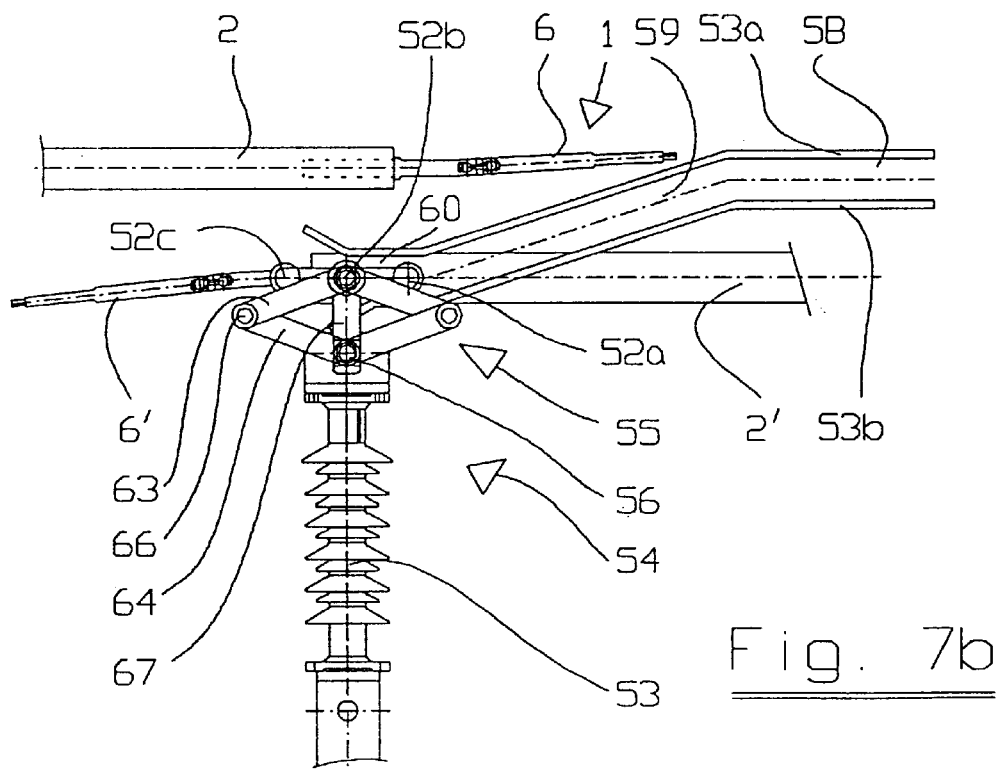
FIG. 7b, the contact rail assembly of FIG. 7a in a second position.

FIG. 7*b* shows a second position of the contact rail assembly 1, in which the contact rail 2' is displaced and laterally offset to the contact rail 2. After a displacement of the contact rail 2', the retaining device 54 moves parallel to the contact rail 2, and the lateral spacing between the isolator 53 and the contact rail 2 remains unchanged. In order to allow a lateral offset motion of the contact rail 2', it is connected to the isolator 53 via a parallelogram linkage 55, which allows the contact rail 2' to swing out transverse to contact rail 2. The sides of the "parallelogram" are formed by rod-like linkage elements 61, 62, 63, 64, and these connecting elements 61, 62, 63, 64 are articulated in pairs, i.e., they are connected so that they rotate about axes perpendicular to the travel plane. One of these joints is formed by the middle guide assembly 52*b* connected to the contact rail 2'. A joint 56 of the parallelogram linkage 55 located opposite the guide assembly 52*b* is attached to the isolator 53, and two additional joints 65, 66 are used for an articulated connection of the connecting elements 61 and 62, or 63 and 64, respectively, that form the sides of the parallelogram. Furthermore, the guide assembly 52*b* connected to the contact rail 2' and functioning as a joint of the parallelogram linkage is connected to the opposing joint 56 of the parallelogram linkage 55 by means of a guide element 67. During the swinging out of the contact rail 2', this guide element 67 moves the guide assembly 52*b* in a direction perpendicular to the contact rail 2' and prevents a movement of the guide assembly 52*b* in the longitudinal direction of the contact rail 2. In the displaced position shown, the guide assembly 53*c* and the displaced retaining device 54 are located at the free ends 53*a'*, 53*b'* of the guide elements 53*a*, 53*b*, and the parallelogram linkage 55 is swung in and the guide assembly 52*b* has moved back relatively near the joint 56.

Figure 8:
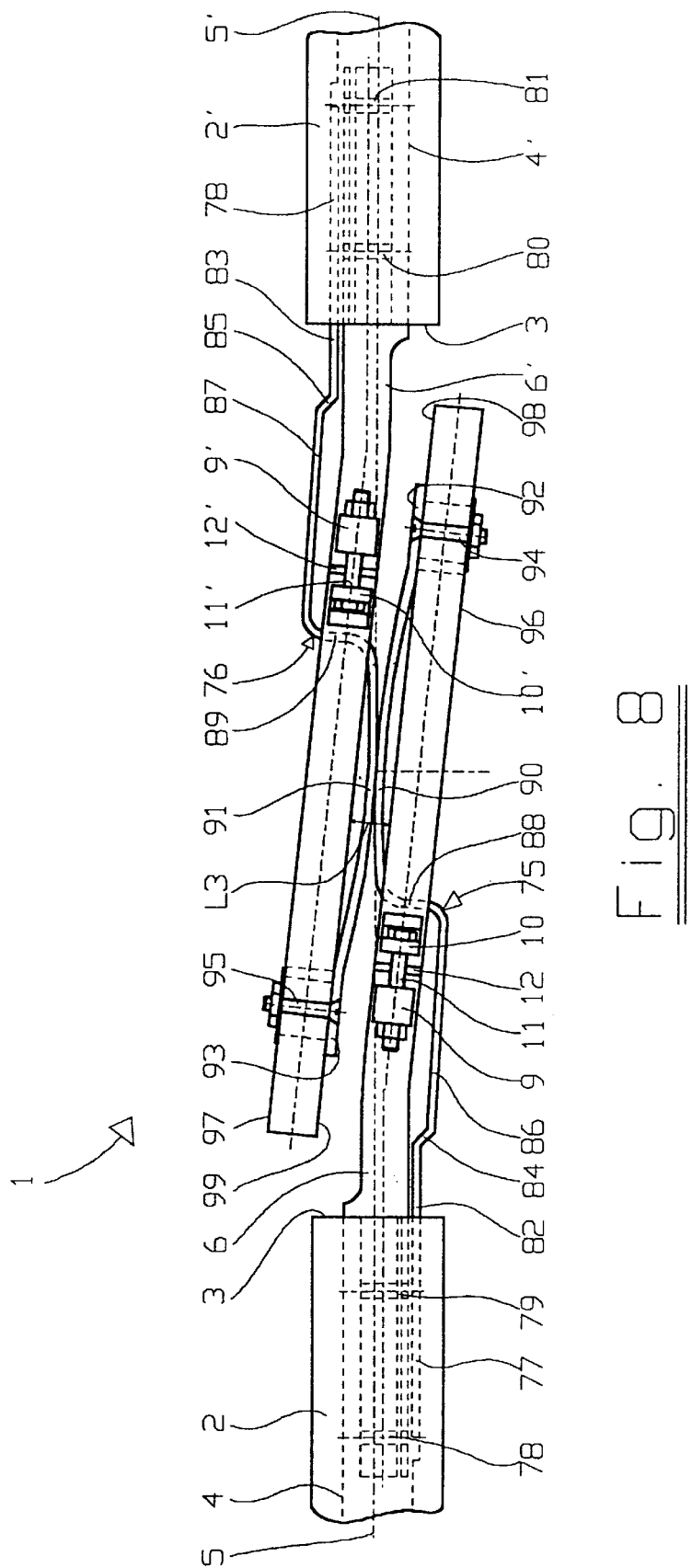
FIG. 8, a contact rail assembly with electrically connected transition horns.

FIG. 8 shows a contact rail assembly 1, in which the transition horns 6, 6' and the respective contact rails 2, 2' are electrically connected, which is required for many applications. The structural and spatial arrangement of the transition horns 6, 6' and the associated contact rails 2, 2' correspond essentially to the contact rail assembly 1 shown in FIG. 1. For example, in this embodiment example as well, the two transition horns 6, 6' are separated by a distance L3, i.e., they do not directly touch. In contrast to the embodiment examples described above (in FIGS. 1 to 7*b*), in which the distance L3 is primarily an electrical "isolation" distance, the distance L3 between the two transition horns 6, 6' in this embodiment example represents a mechanical decoupling. Due to this mechanical decoupling, it is possible to set up a transition horn 6, 6' and its associated contact rail 2, 2' to move relative to the other contact rails 2, 2' and the other transition horn 6, 6', respectively. For example, the contact rail assembly 1 can pivot (cf. FIGS. 6*a* and 6*b*) or move translationally (cf. FIGS. 7*a* and 7*b*).

The electrical connection between the transition horn 6 and the respective contact rail 2 and the other transition horn 6' and the respective contact rail 2' is achieved by elastic contact elements 75, 76 acting like leaf springs. The two contact elements 75, 76 are designed to be "S-shaped" and identical; the contact element 75 is connected to contact rail 2 and its transition horn 6, and the contact element 76 is connected to the other contact rail 2' and its transition horn 6'. Furthermore, the contact elements 75, 76 are arranged spatially in the same way to the contact rails 2, 2' and the respective transition horns 6, 6', so that, as already described in relation to FIG. 1, the entire contact rail assembly 1 is point-wise symmetrical as viewed from above.

Individual sections of the contact elements 75, 76 can be differentiated according to their structure. With a first section 77, 78, the contact element 75, 76 extends into the attachment compartment 4, 41 of the contact rail 2, 2' and there contacts both the contact rail 2, 2' and also the transition horn 6, 6'. This first section 77, 78 is located on that outer side 96, 97 of the transition horn 6, 6' which is facing away from the other transition horn 6, 6'. Furthermore, the contact element 75, 76 is screwed on this section 77, 78 to the contact rail 2, 2' and the transition horn 6, 6' in the region of the attachment compartment 4, 41, which is indicated by the dashed boreholes 78, 79 and 80, 81, respectively.

A second section 82, 83 extends laterally from the transition horn 6, 6' from the attachment compartment 4, 4' in the direction of the free end of the transition horn 6, 6'. On a third section 84, 85, which is relatively short and indented relative to the second section 82, 83, the contact element 75, 76 extends away from the outside 96, 97 of the transition horn 6, 6'. A fourth section 86, 87 running along the side of the transition horn 6, 6' adjoins the third section 84, 85.

An adjoining fifth section 88, 89 is essentially perpendicular to the fourth section 86, 87 and passes through the transition horn 6, 6' in the region of the longitudinal recess 17c (cf. FIG. 2). The transition between the fourth section 86, 87 and the fifth section 88, 89 is rounded, just like the transition between the fifth section 88, 89 and an adjoining sixth section 90, 91.

The sixth section 90, 91 extends along the outside 98, 99 of the transition horn 6, 6' in the direction of its free end, which is facing the other transition horn 6, 6'. The sixth section 90, 91 is characterized in that it is convex, as seen from above, i.e., in the direction of the opposing transition horn 6, 6', is bulged or is curved like a leaf spring. These sections 90 and 91 press against each other and thus establish the electrical connection between the contact elements 75 and 76 and the transition horns 6, 6'.

Following the sixth section 90, 91 is a seventh section 92, 93, which directly contacts the outside of the transition horn 6, 6'. The contact element 75, 76 is attached in the region of the seventh section 92, 93 at the transition horn 6, 6' by a screw connection 94, 95. By screwing the first section 77, 78 and the seventh section 92, 93 of the contact element 75, 76 to the transition horn 6, 6', a defined electrical connection between the contact element 75, 76 and the transition horn 6, 6' is established.

Due to the elasticity of the contact elements 75, 76 a sufficiently large contact force between the contact elements 75, 76 and correspondingly small electrical transition resistance is achieved. Furthermore, it is thus possible to use the contact elements 75, 76 in conjunction with a pivoting contact rail assembly 1 (cf. FIGS. 6a, 6b) or a translational displaceable contact rail assembly 1 (cf. FIGS. 7a, 7b). When pivoting in the pivoting contact rail assembly 1, the contact elements 75 and 76 first make an asymmetrical contact, then press each other apart until the illustrated position is reached.

Aluminum sheet metal or copper plate, for example, can be used as material for the manufacture of the contact elements 75, 76.

I claim:

1. A contact rail assembly for electrically driven vehicles comprising:
    a plurality of generally rigid contact rails arranged end-to-end so that opposing ends of the contact rails are separated by a first distance,
    transition horns at each of the opposing ends extending into a transition region located between the contact rails, the horns arranged generally parallel to one another in a section of the transition region and separated by a second distance, the horns arranged at an angle with respect to longitudinal axes of the contact rails,
    wherein each of said horns is curved so that each of said horns' mid-line is tangential to the longitudinal axis of each corresponding contact rail.

2. A contact rail assembly for electrically driven vehicles comprising:
    a plurality of generally rigid contact rails arranged end-to-end so that opposing ends of the contact rails are separated by a first distance,
    transition horns at each of the opposing ends extending into a transition region located between the contact rails, the horns arranged generally parallel to one another in a section of the transition region and separated by a second distance, the horns arranged at an angle with respect to longitudinal axes of the contact rails, and
    wherein an underside of each of said horns facing a plane of travel of the vehicles is curved upward at its free end and the portion of each of said horns between the free end and a first end-section is generally parallel to the plane of travel.

3. A contact rail assembly as set forth in claim 2 wherein the curvature of the underside of each of said horns is adjustable.

4. A contact rail assembly as set forth in claim 3 wherein an adjusting mechanism is connected to each of said horns for adjusting the curvature of the underside of the horn, the adjusting mechanism having a tensioning element.

5. A contact rail assembly as set forth in claim 4 wherein each of said horns has a slit extending adjacent the tensioning element.

6. A contact rail assembly as set forth in claim 5 wherein the tensioning element and the slit are located at a top side of the horn.

7. A contact rail assembly as set forth in claim 5 wherein the horn includes an opening, the slit extending into the opening.

8. A contact rail assembly as set forth in claim 7 wherein the horn includes a contact element having a portion that passes through the opening and an additional portion located between the horn and an adjacent horn, wherein said additional portion is convex and contacts a corresponding contact element of the adjacent horn.

9. A contact rail assembly for electrically driven vehicles comprising:
    a plurality of generally rigid contact rails arranged end-to-end so that opposing ends of the contact rails are separated by a first distance,
    transition horns at each of the opposing ends extending into a transition region located between the contact rails, the horns arranged generally parallel to one another in a section of the transition region and separated by a second distance, the horns arranged at an angle with respect to longitudinal axes of the contact rails,
    wherein each of said contact rails and its corresponding horn can move relative to an adjacent contact rail and a corresponding horn of the adjacent contact rail and
    wherein each of said contact rails and its corresponding horn can pivot about a pivot axis which is positioned transverse to a travel direction and parallel to a plane of travel of the vehicles.

10. A contact rail assembly for electrically driven vehicles comprising:
    a plurality of generally rigid contact rails arranged end-to-end so that opposing ends of the contact rails are separated by a first distance,
    transition horns at each of the opposing ends extending into a transition region located between the contact rails, the horns arranged generally parallel to one another in a section of the transition region and separated by a second distance, the horns arranged at an angle with respect to longitudinal axes of the contact rails, and
    wherein each of said horns includes an attachment element for attachment of a contact wire between the horn and its corresponding contact rail.

11. A contact rail assembly for electrically driven vehicles comprising:
- a plurality of generally rigid contact rails arranged end-to-end so that opposing ends of the contact rails are separated by a first distance,
- transition horns at each of the opposing ends extending into a transition region located between the contact rails, the horns arranged generally parallel to one another in a section of the transition region and separated by a second distance, the horns arranged at an angle with respect to longitudinal axes of the contact rails, and
- wherein the horn extends into an attachment compartment at the end of its corresponding contact rail and is mechanically and electrically connected to the contact rail.

12. A contact rail assembly for electrically driven vehicles comprising:
- a plurality of generally rigid contact rails arranged end-to-end so that opposing ends of the contact rails are separated by a first distance,
- transition horns at each of the opposing ends extending into a transition region located between the contact rails, the horns arranged generally parallel to one another in a section of the transition region and separated by a second distance, the horns arranged at an angle with respect to longitudinal axes of the contact rails, and
- wherein the horns are electrically connected to each other by at least one elastic contact element located between the horns.

* * * * *